(12) United States Patent
Iyer et al.

(10) Patent No.: US 10,938,904 B2
(45) Date of Patent: Mar. 2, 2021

(54) MULTI-PROCESSOR/ENDPOINT DATA SPLITTING SYSTEM

(71) Applicant: Dell Products L.P., Round Rock, TX (US)

(72) Inventors: Shyamkumar T. Iyer, Austin, TX (US); Timothy M. Lambert, Austin, TX (US); William Price Dawkins, Lakeway, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/396,200

(22) Filed: Apr. 26, 2019

(65) Prior Publication Data

US 2020/0344298 A1 Oct. 29, 2020

(51) Int. Cl.
*H04L 12/935* (2013.01)
*H04L 29/08* (2006.01)
*H04L 12/18* (2006.01)
*H04L 29/06* (2006.01)

(52) U.S. Cl.
CPC ...... *H04L 67/1097* (2013.01); *H04L 12/1886* (2013.01); *H04L 49/3072* (2013.01); *H04L 69/22* (2013.01)

(58) Field of Classification Search
CPC ............. H04L 67/1097; H04L 12/1886; H04L 49/3072; H04L 69/22
USPC ........................................................ 709/245
See application file for complete search history.

(56) References Cited

U.S. PATENT DOCUMENTS

| | | | |
|---|---|---|---|
| 7,007,096 B1 | 2/2006 | Lisitsa et al. | |
| 10,346,337 B1* | 7/2019 | Johnson | G06F 13/4022 |
| 2014/0297775 A1 | 10/2014 | Davda | |
| 2016/0077989 A1 | 3/2016 | Pulyala | |
| 2018/0101498 A1 | 4/2018 | Cosby | |

OTHER PUBLICATIONS

PCT International Search Report and Written Opinion, Application. No. PCT /US2020/029704, dated Jul. 10, 2020.

* cited by examiner

*Primary Examiner* — Glenford J Madamba
(74) *Attorney, Agent, or Firm* — Haynes and Boone, LLP

(57) ABSTRACT

A multi-endpoint adapter device includes a splitter device that is coupled to a network port and a plurality of endpoint subsystems that are each coupled to a processing subsystem. The splitter device receives, via the network port, a first data payload, and identifies both a first data sub-payload that is included in the first data payload and that is associated with a first endpoint subsystem included in the plurality of endpoint subsystems and a second data sub-payload that is included in the first data payload and that is associated with a second endpoint subsystem included in the plurality of endpoint subsystems. The splitter device then splits the first data payload into the first data sub-payload and the second data sub-payload, and forwards both the first data sub-payload to the first endpoint subsystem and the second data sub-payload to the second endpoint subsystem.

18 Claims, 9 Drawing Sheets

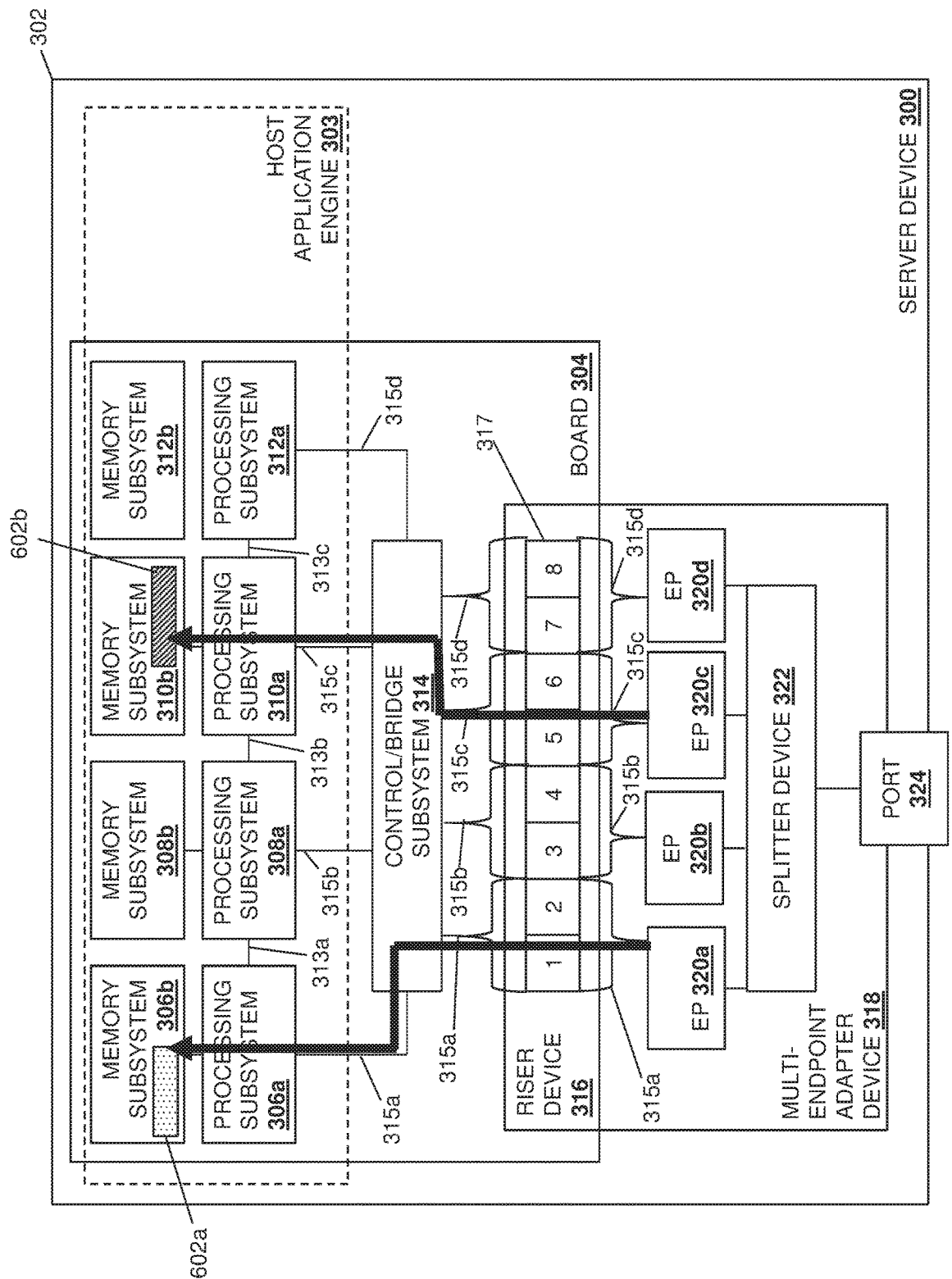

MULTI-PROCESSOR/ENDPOINT DATA SPLITTING SYSTEM

BACKGROUND

The present disclosure relates generally to information handling systems, and more particularly to splitting data between processor and endpoint combinations in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as for example, server devices, are sometimes utilized to process network data streams, and some network data streams may include a payloads having separate portions or chunks. For example, a video stream may include various encoding information, an audio portion, a video portion, language information, subtitles, digital rights management (DRM), and/or other video stream portions known in the art. In another example, a network data stream may include a header/metadata portion and a payload portion. In some embodiments, network data streams are processed by server devices that include multiple processors and that utilize a Non-Uniform Memory Access (NUMA) computer memory design in which each processor is provided a local memory that it can access quickly, with those processors coupled together via processor interconnects (e.g., Ultra-Path Interconnects (UPIs) available in processing systems provided by INTEL® Corporation of Santa Clara, Calif., United States) that allow the processors to access memory that is local to the other processors. When such processors process the network data streams discussed above, each processor may be dedicated to process a respective portion of those network data streams.

For example, a first processor may be dedicated to processing header/metadata portions included in the network data stream, while a second processor may be dedicated to processing payload portions included in the network data stream. The separate processing of various portions of network data streams may be accomplished by copying the network data stream that was received by one processor to the local memory provided for each of the other processor(s) via the UPIs. Each processor responsible for processing a portion of the network data stream may then fragment the network data stream into its various portions, and may process its assigned portion of the network data stream. As such, conventional network data stream processing incurs latency, bandwidth costs, and other inefficiencies associated with, for example, the communication of the network data stream between the processors via the UPIs, as well as other issues that will be apparent to one of skill in the art in possession of the present disclosure.

Furthermore, such server devices may be provided with multi-endpoint adapter devices that provide a plurality of endpoints (e.g., PCIe endpoints) that are each coupled to respective processors via communication couplings. Those communication couplings may include lanes (e.g., PCIe lanes) that are split in order to provide each processor coupled to a respective endpoint, and the multi-endpoint adapter device may allow the network data stream to be received via the network by each endpoint and forwarded to the processor associated with that endpoint via its respective communication couplings. As such, the network data stream may be processed by different processors without the need to use of the UPIs to copy the network data stream from the local memory provided for any particular processor to the local memory provided for another processor. However, this process still incurs inefficiencies such as, for example, requiring each processor to obtain its own copy of the network data stream via the network.

Accordingly, it would be desirable to provide an improved multi-processor data stream processing system.

SUMMARY

According to one embodiment, an Information Handling System (IHS) includes a processing system; a memory system that is coupled to the processing system and that includes instructions that, when executed by the processing system, cause the processing system to provide a multi-endpoint adapter splitter engine configured to: receive, via a network port, a first data payload; identify a first data sub-payload that is included in the first data payload and that is associated with a first endpoint subsystem included in a plurality of endpoint subsystems; identify a second data sub-payload that is included in the first data payload and that is associated with a second endpoint subsystem included in the plurality of endpoint subsystems; split the first data payload into the first data sub-payload and the second data sub-payload; forward the first data sub-payload to the first endpoint subsystem; and forward the second data sub-payload to the second endpoint subsystem.

Figure 2:
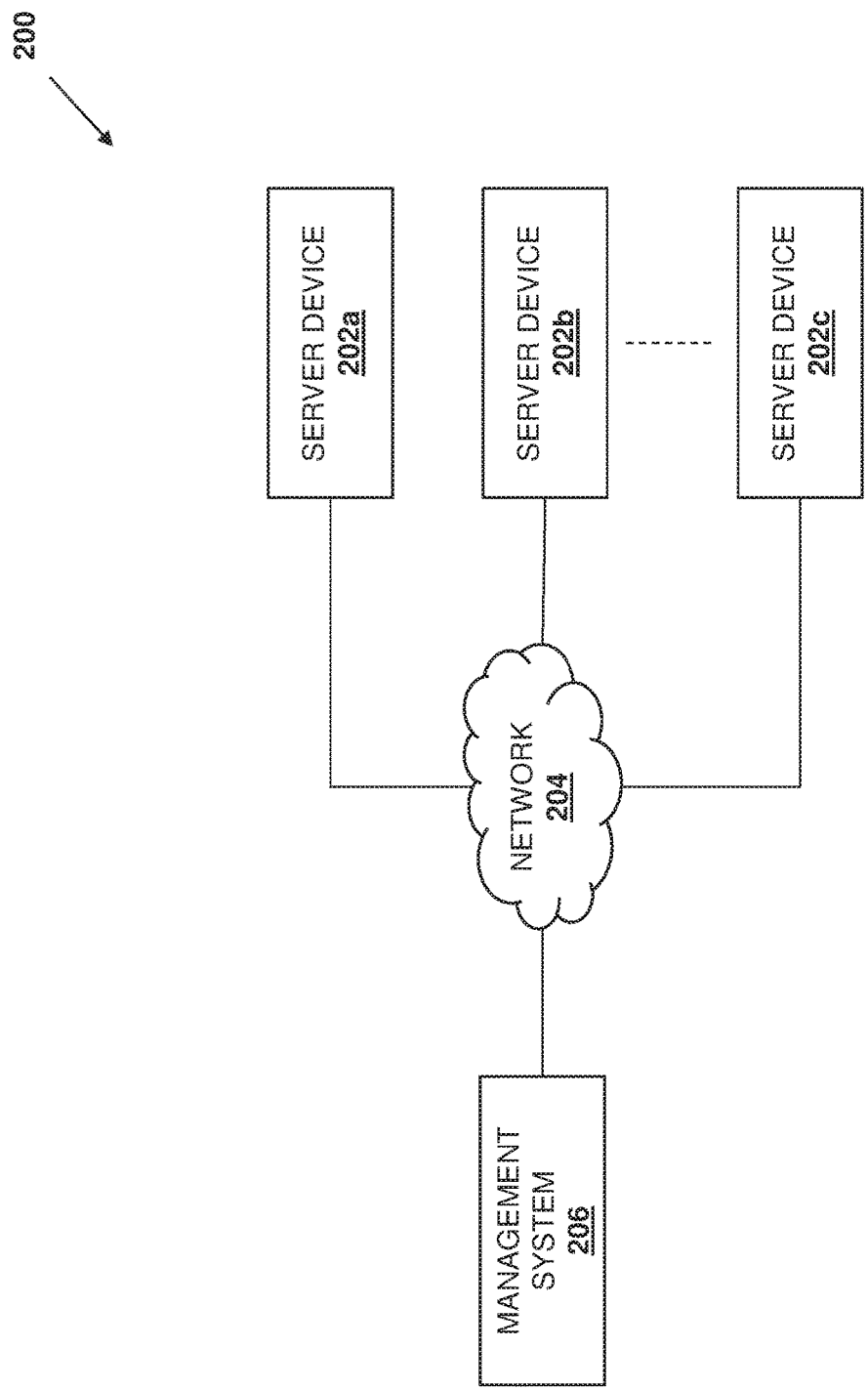
FIG. 2 is a schematic view illustrating an embodiment of a networked system including a plurality of server devices coupled to a management system via a network.
Figure 4:
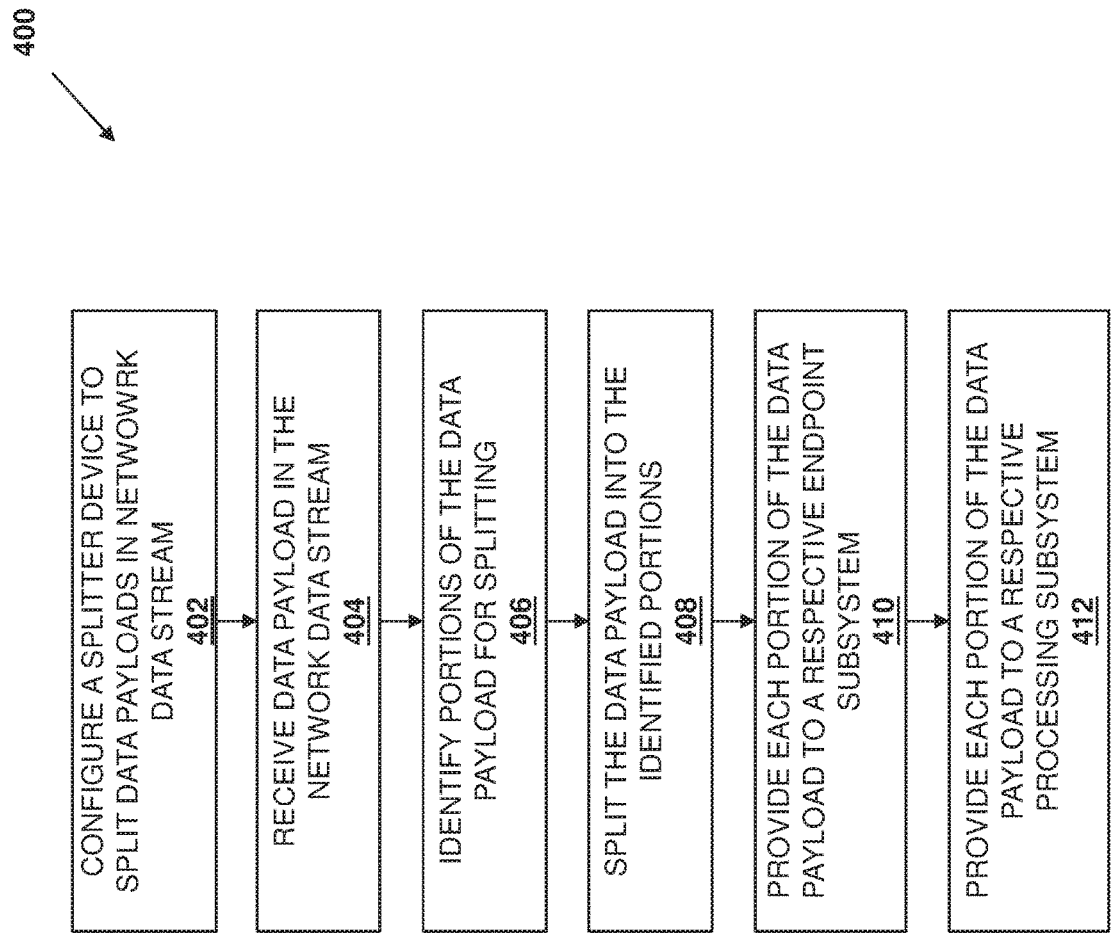
FIG. 4 is a flow chart illustrating an embodiment of a method of splitting a network data stream.
Figure 6A:
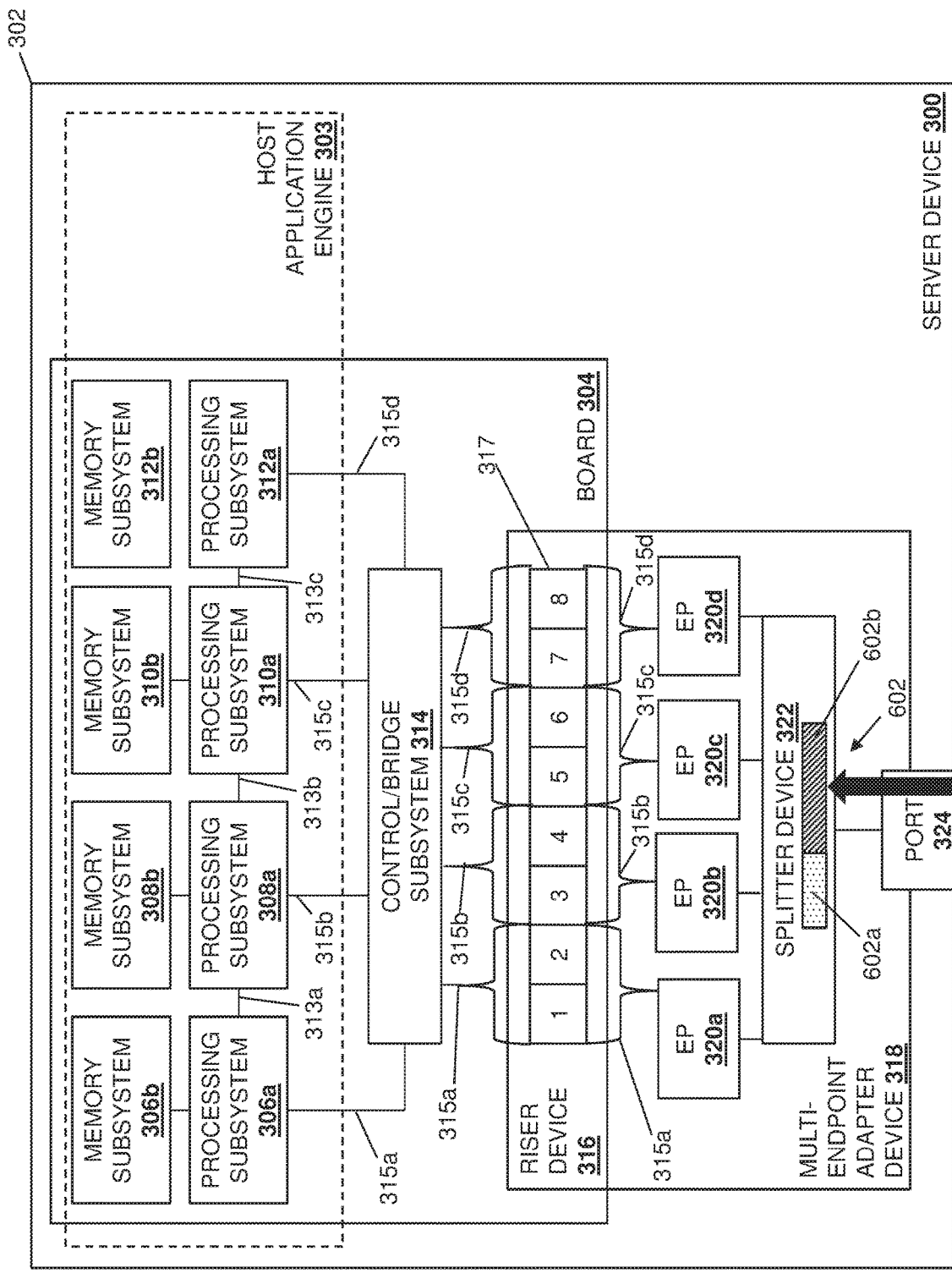
FIG. 6A is a schematic view illustrating an embodiment of splitting a network data stream in the multi-processor/ endpoint data splitting system provided by the server device of FIG. 2 and during the method of FIG. 4.
Figure 6B:
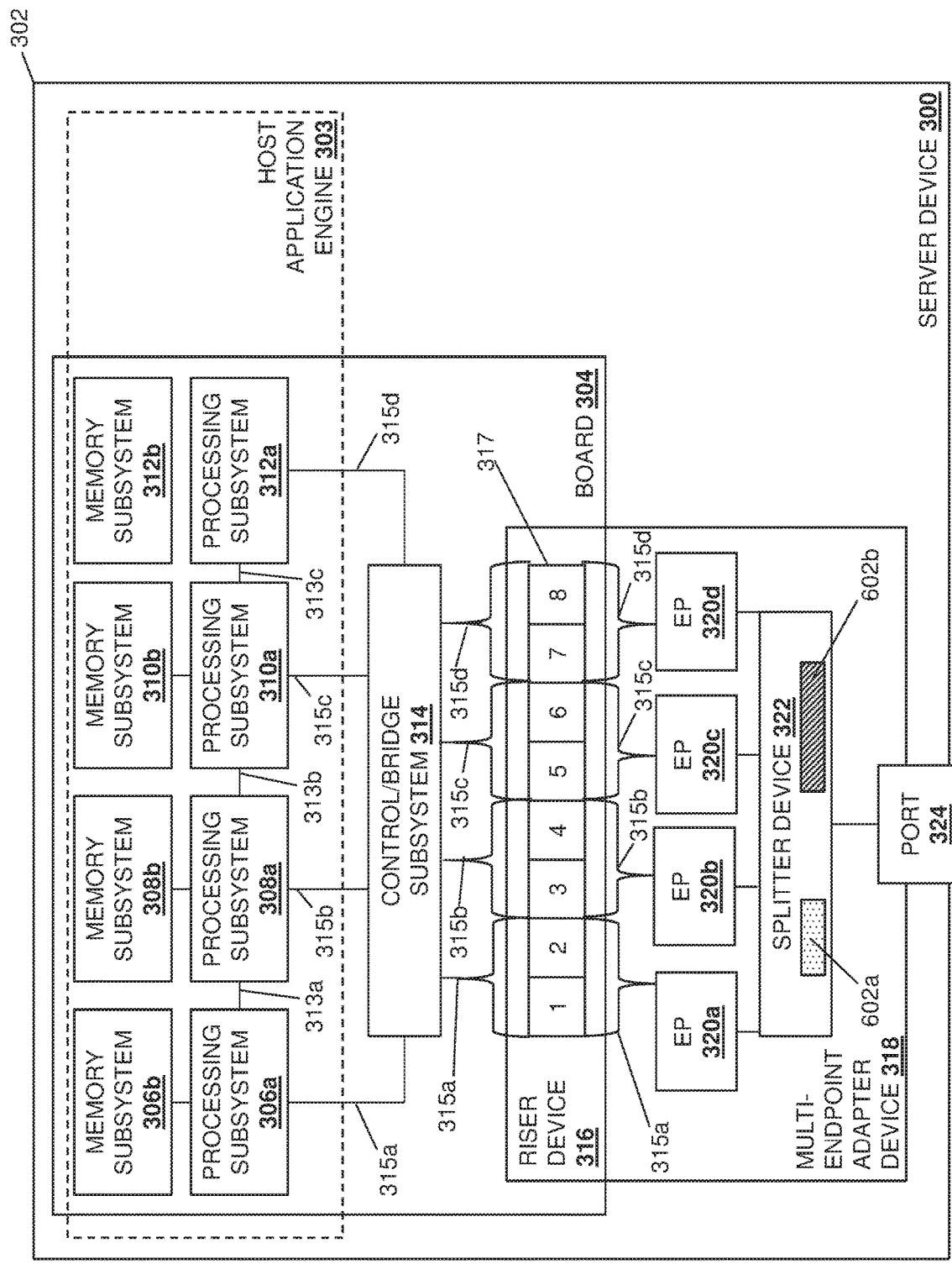

FIG. 6B is a schematic view illustrating an embodiment of splitting a network data stream in the multi-processor/endpoint data splitting system provided by the server device of FIG. 2 and during the method of FIG. 4.

Figure 6C:
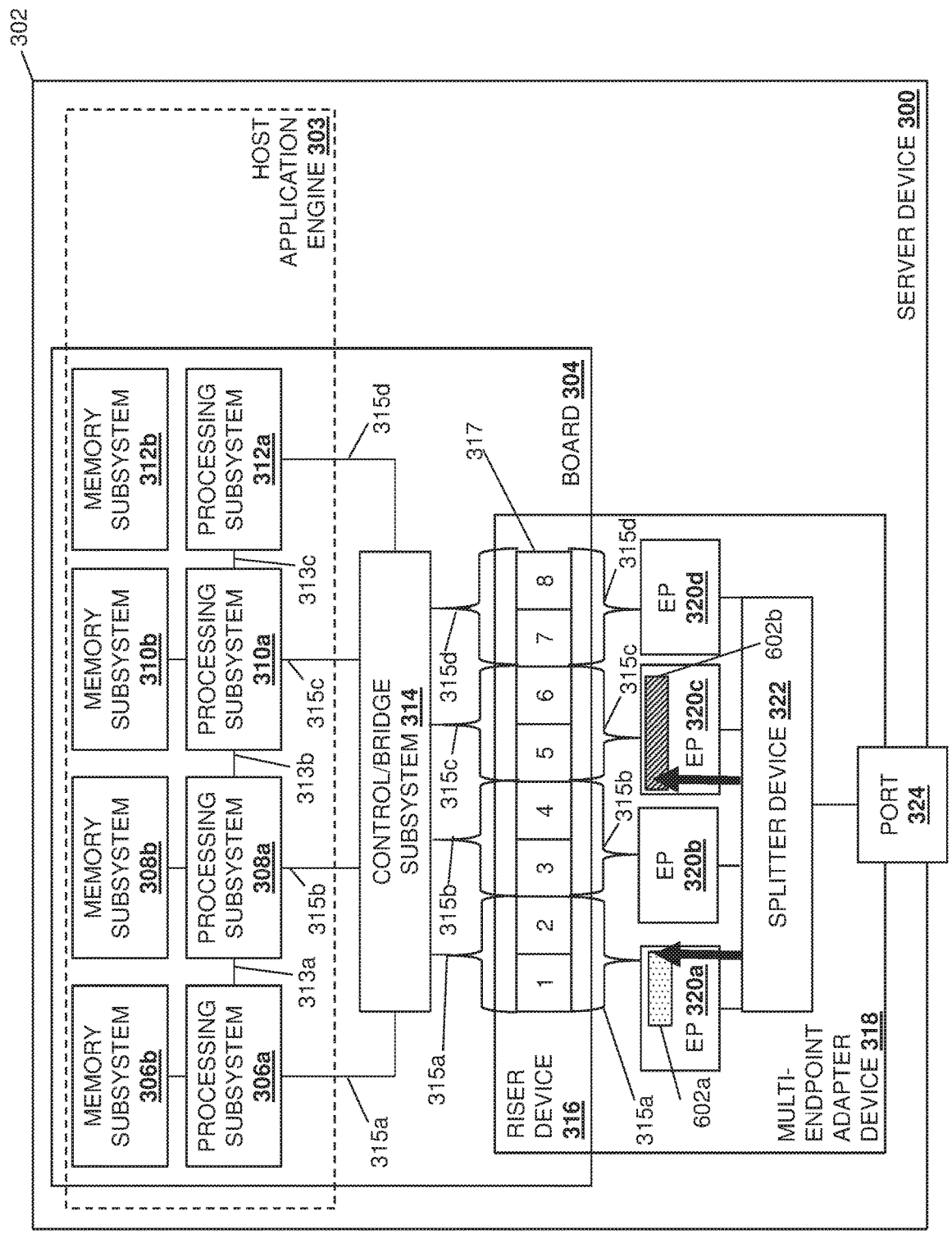

FIG. 6C is a schematic view illustrating an embodiment of splitting a network data stream in the multi-processor/endpoint data splitting system provided by the server device of FIG. 2 and during the method of FIG. 4.

FIG. 6D is a schematic view illustrating an embodiment of splitting a network data stream in the multi-processor/endpoint data splitting system provided by the server device of FIG. 2 and during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
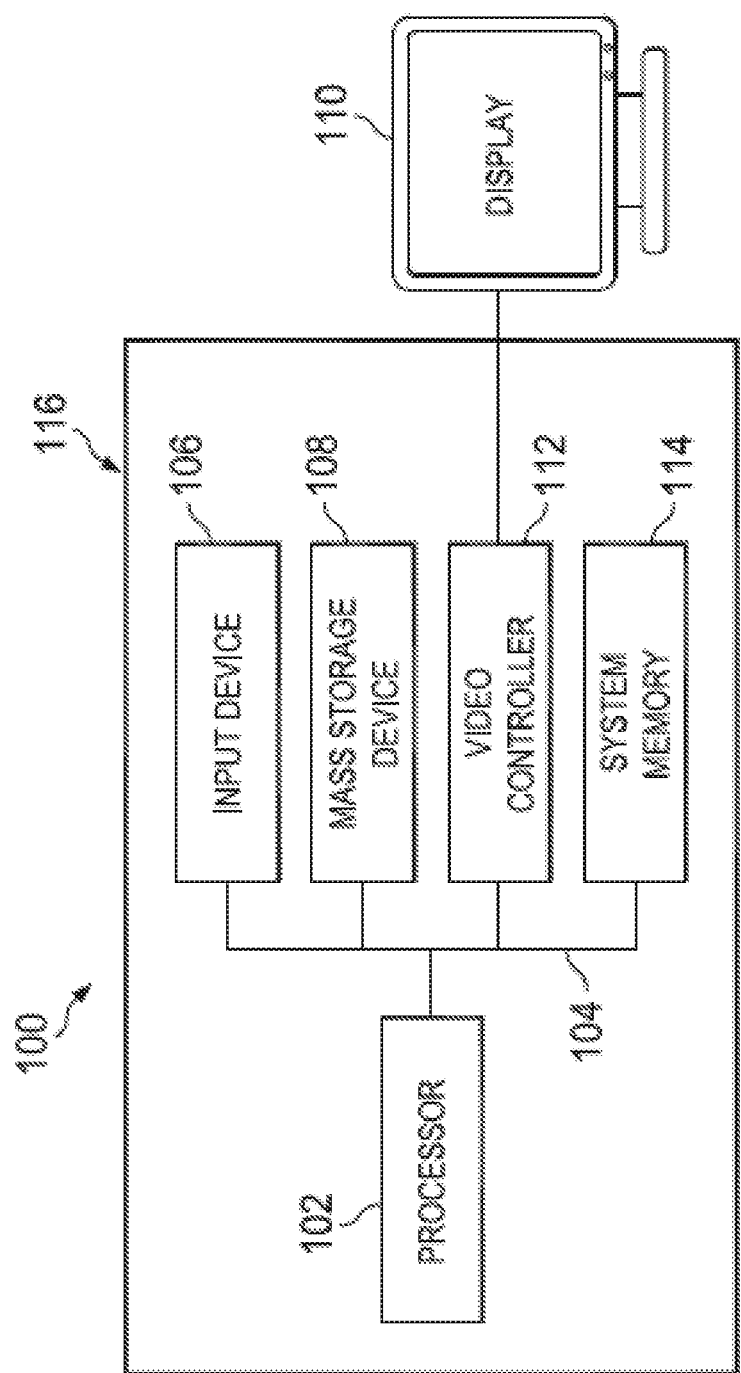
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Referring now to FIG. 2, an embodiment of a networked system 200 is illustrated. In the illustrated embodiment, the networked system 200 includes a plurality of server devices 202a, 202b, and up to 202c. In an embodiment, any or all of the server devices 202a-202c may be provided by the IHS 100 discussed above with reference to FIG. 1, and/or may include some or all of the components of the IHS 100. However, while illustrated and discussed as server devices, one of skill in the art in possession of the present disclosure will recognize that the multi-processor/endpoint data splitting system of the present disclosure may be provided in any device that may be configured to operate similarly as discussed below. The server devices 202a-c are coupled to a network 204 that may be provided by a Local Area Network (LAN), the Internet, and/or other networks known in the art. A management system 206 is also coupled through the network 204 to the server devices 202a-c. The management system 206 may be provided by the IHS 100 discussed above with reference to FIG. 1, and/or may include some or all of the components of the IHS 100. In specific examples, the management system 206 may be provided by server devices, desktop computing devices, laptop/notebook computing devices, tablet computing devices, mobile phones, and/or any other device that may provide the management system functionality discussed below. While a few particular devices are illustrated, one of skill in the art in possession of the present disclosure will recognize that many more devices may (and typically will) be provided in the networked system 200 (e.g., in a datacenter) while remaining within the scope of the present disclosure. Furthermore, while a specific networked system 200 has been illustrated and described, one of skill in the art in possession of the present disclosure will recognize that the multi-processor/endpoint data splitting system of the present disclosure may include a variety of components and component configurations while remaining within the scope of the present disclosure as well.

Figure 3:
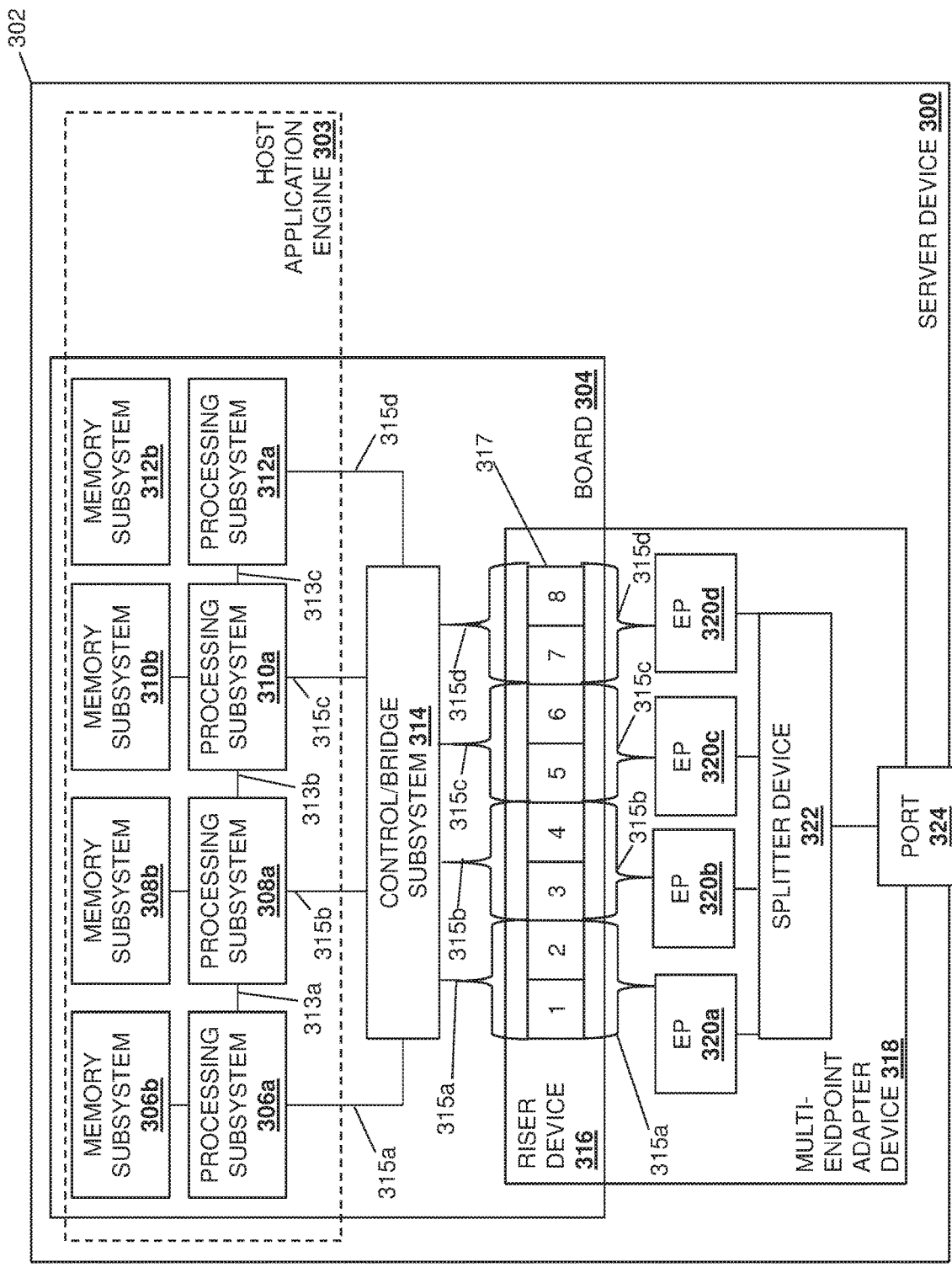
FIG. 3 is a schematic view illustrating an embodiment of a server device that may be included in the networked system of FIG. 2, and that may provide the multi-processor/endpoint data splitting system of the present disclosure.

Referring now to FIG. 3, an embodiment of a server device 300 is illustrated that may provide any of the server devices 202a-c discussed above with reference to FIG. 2. As such, the server device 300 may be provided by the IHS 100 discussed above with reference to FIG. 1 and/or may include some or all of the components of the IHS 100. Furthermore, while illustrated and discussed as a server device 300, one of skill in the art in possession of the present disclosure will recognize that the functionality of the server device 300 discussed below may be provided by other devices that are configured to operate similarly as discussed below. For example, in other embodiments the server device 300 may be a client device, a combination of a client device and a server device, and/or other devices that would be apparent to one of skill in the art in possession of the present disclosure. In the illustrated embodiment, the server device 300 includes a chassis 302 that houses the components of the server device 300, only some of which are illustrated below. For example, the chassis 302 may house a host application processing system (which may include the processor 102 discussed above with reference to FIG. 1 provided in one or more of the processing subsystems discussed below) and a host application memory system (which may include the memory 114 discussed above with reference to FIG. 1 provided in one or more of the memory subsystems discussed below) that is coupled to the host application processing system and that includes instructions that, when executed by the host application processing system, cause the host application processing system to provide a host application engine 303 that is configured to perform the functionality of the host application engines and/or host application subsystems discussed below.

The chassis 302 may also house a board 304 such as, for example, a motherboard and/or other circuit board that would be apparent to one of skill in the art in possession of the present disclosure. In the illustrated embodiment, a plurality of processing subsystems are provided on the board 304 and include a processing subsystem 306a, a processing subsystem 308a, a processing subsystem 310a, and a processing subsystem 312a, with the processing subsystems coupled together via processing subsystem interconnects such as Inter-Chip Global Memory Interconnect (xGMI) available in processing systems provided by AMD® of Santa Clara, Calif., United States, Global Memory Connect (GMI) available in processing systems provided by AMD®, Ultra-Path Interconnects (UPIs) available in processing systems provided by INTEL® Corporation of Santa Clara, Calif., United States, etc., and/or any other processing interconnect that would be apparent to one of skill in the art in possession of the present disclosure. For example, in the illustrated embodiment, the processing subsystems 306a and 308a are coupled together via a processing subsystem interconnect 313a, the processing subsystems 308a and 310a are coupled together via a processing subsystem interconnect 313b, and the processing subsystems 310a and 312a are coupled together via a processing subsystem interconnect. Furthermore, each of the processing subsystems 306a, 308a, 310a, and 312a are provided with and connected to respective memory subsystems 306b, 308b, 310b, and 312b. For example, the processing subsystems and memory subsystems in the server device 300 may utilize a Non-Uniform Memory Access (NUMA) computer memory design in which each respective processing subsystem is connected to a respective local memory subsystem to provide a respective NUMA node (i.e., the processing subsystem 306a and its local memory subsystem 306b provide a first NUMA node, the processing subsystem 308a and its local memory subsystem 308b provide a second NUMA node, and so on.) However, while four processing subsystems/memory subsystems (e.g., four NUMA nodes) are illustrated in FIG. 3, one of skill in the art in possession of the present disclosure will recognize that more or fewer processing subsystems/memory subsystems (e.g., NUMA nodes) may be provided according to the teachings of the present disclosure will falling within its scope as well. In the example illustrated in FIG. 3, the host application processing system may include one or more of the NUMA nodes that operate (via processing subsystem(s) executing instructions on their respective memory subsystem(s)) to provide the host application engine 303.

In the illustrated embodiment, each of the processing subsystems 306a, 308a, 310a, and 312a are coupled to a control/bridge subsystem 314 that may be provided on the board 304. While illustrated and described as a control/bridge subsystem, one of skill in the art in possession of the present disclosure will recognize that other subsystems (e.g., a PCIe switch) may perform the functionality of the control/bridge subsystem 314 discussed below while remaining within the scope of the present disclosure as well. In the illustrated embodiment, the control/bridge subsystem 314 may be provided by hardware on the board 304 that is coupled to a riser device 316 that is included on the board 304. However, in other embodiments, the control/bridge subsystem 314 may be provided as part of the riser device 316 while remaining within the scope of the present disclosure as well. In various examples, the coupling between the control/bridge subsystem 314 and the riser device 316 may be configurable or non-configurable. The riser device 316 includes one or more connectors 317. In the illustrated example, the connector(s) 317 include two x16 connectors (e.g., PCIe connectors) that are provided by the eight x4 connectors illustrated in FIG. 3 (e.g., numbered "1", "2", "3", and "4" for the first x16 connector, and "5", "6", "7", and "8" for the second x16 connector). However, one of skill in the art in possession of the present disclosure will recognize that any number of connector(s) of different types, sizes, and/or other connector characteristics will fall within the scope of the present disclosure as well.

In the illustrated embodiment, one or more multi-endpoint adapter devices 318 are coupled to the riser device 316 and include a plurality of endpoint subsystems that are coupled to the riser device 316. As such, while the multi-endpoint adapter device(s) 318 are illustrated as a single multi-endpoint adapter device, one of skill in the art in possession of the present disclosure will recognize that a pair of multi-endpoint adapter devices may be coupled to the riser device 316 (e.g., with each multi-endpoint adapter device connected to a respective one of the two x16 connectors provided on the riser device 316 as discussed above), and may each provide a plurality of endpoint subsystems that are coupled to the riser device 316. In the illustrated example, an endpoint subsystem 320a, an endpoint subsystem 320b, an endpoint subsystem 320c, and an endpoint subsystem 320d are provided by the multi-endpoint adapter device(s) 318 and coupled to the connectors 317 on the riser device 316. In a specific example, the endpoint subsystems provided on the multi-endpoint adapter device(s) 318 may be provided by physical or virtual Peripheral Component Interconnect express (PCIe) endpoints, such as, for example, software-defined Network Interface Controllers (NICs), physical NICs, a host bus adapter (HBA) and/or any other endpoint subsystem that is configured to supply a stream of data that would be apparent to one of skill in the art in possession of the present disclosure. In some embodiments, more than one endpoint subsystem 320a-320d may be provided by a single NIC such as, for example, when the NIC is configured to provide a "multi-PCIe-endpoint device" that allows for the splitting of the resources of that NIC between multiple processing subsystems. For example, the NIC endpoint may be configured to split its x16 connection to the riser device 316 into two x8 connections to a pair of processing subsystems, or four x4 connections to each of four processing subsystems.

In various embodiments, traces, cabling, and/or other couplings between the control/bridge subsystem 314, the riser device 316, and the endpoint subsystems 320a-320d may provide a communication coupling 315a between the processing subsystem 306a and the endpoint subsystem 320a, a communication coupling 315b between the processing subsystem 308a and the endpoint subsystem 320b, a communication coupling 315c between the processing subsystem 310a and the endpoint subsystem 320c, and a communication coupling 315d between the processing subsystem 312a and the endpoint subsystem 320d. However, while communication couplings between specific processing subsystems and endpoint subsystems are illustrated, one of skill in the art in possession of the present disclosure will recognize that communication couplings between different processing subsystems and endpoint subsystems will fall within the scope of the present disclosure as well.

In some embodiments, the communication couplings 315a-315d between the endpoint subsystems 320a-320d provided on the multi-endpoint adapter device(s) 318 and the processing subsystems 306a, 308a, 310a, and 312a may be configurable to allocate communication resources in the server device 300 as desired, or may be non-configurable such that communication resources in the server device are static/fixed. In some embodiments, each endpoint subsystem 320a-320d may be configured to perform Direct Memory Access (DMA) operations with one or more of the memory subsystem 306b, 308b, 310b, or 312b via the communication couplings 315a-315d. While four endpoint subsystems 320a-320d are illustrated in FIG. 3, one of skill in the art in possession of the present disclosure will recognize that the multi-endpoint adapter device(s) 318 may include at least two endpoint subsystems (e.g., PCIe endpoints, NICs, etc.) and may perform other functionality while remaining within the scope of the present disclosure as well.

In the illustrated embodiment, the multi-endpoint adapter device(s) 318 may include a splitter device 322 that is coupled to the endpoint subsystems 320a-320d. In a different examples, the splitter device 322 may include an application-specific integrated circuit (ASIC) chip, a field programmable gate array (FPGA), and/or any other programmable splitter hardware that would be apparent to one of skill in the art in possession of the present disclosure. As such, the splitter device 322 may include a splitter processing system (not illustrated, but which may include the processor 102 discussed above with reference to FIG. 1) and a splitter memory system (not illustrated, but which may include the memory 114 discussed above with reference to FIG. 1) that is coupled to the splitter processing system and that includes instructions that, when executed by the splitter processing system, cause the splitter processing system to provide a splitter engine that is configured to perform the functionality of the splitter engines and/or splitter devices discussed below.

In the illustrated embodiment, the multi-endpoint adapter device(s) 318 may include a port 324 that is coupled to the splitter device 322. For example, the port 324 may include an RJ45 port, an SFP+ port, a QSFP port, a MINISAS HD port, and/or any other port/connector that would be apparent to one skill in the art in possession of the present disclosure. In some embodiments, the port 324 may be coupled to the network 204, may be coupled directly to another device (e.g., another server device 202a-202c, a storage system, a management system, etc.), and/or may be coupled in a variety of manners that would be apparent to one of skill in the art in possession of the present disclosure. While a single port is illustrated in FIG. 3, one of skill in the art in possession of the present disclosure will recognize that any number of ports may be included on the multi-endpoint adapter device 318 and coupled to the splitter device 322. While a specific server device 300 has been illustrated, one of skill in the art in possession of the present disclosure will recognize that server devices (or other devices operating according to the teachings of the present disclosure in a manner similar to that described below for the server device 300) may include a variety of components and/or component configurations for providing conventional server device functionality, as well as the functionality discussed below, while remaining within the scope of the present disclosure as well.

Referring now to FIG. 4, an embodiment of a method 400 for splitting network data streams by a multi-processor/endpoint data splitting system is illustrated. As discussed below, the systems and methods of the present disclosure provide for configuring a splitter device to split data received at a multi-endpoint adapter device. For example, the splitter device may be configured to asymmetrically or symmetrically split an incoming network data stream into network data stream portions, and provide the network data stream portions to respective processing subsystems coupled to the multi-endpoint adapter device via respective endpoint subsystems that are provided by the multi-endpoint adapter device coupled to those respective processing subsystems. Prior to splitting the network data stream, a host application may notify the endpoint subsystems and the splitter device how the different processing subsystems are expected to process the network data stream, and these configuration notifications may be used by the splitter device to perform the splitting of the incoming network data stream. As such, a more efficient server device for processing network data streams is provided that operates to split network data streams into various portions that are provided directly to their respective processing subsystems and without the need to copy the network data stream to each processing subsystem (as is required in conventional server devices that utilize multiple processors in the processing of network data streams.) The elimination of the need to copy the network data stream to each of the processing subsystems (e.g., via processing subsystem interconnects connecting those processing subsystems), or the need to obtain the network data stream by each processing subsystem via the network, provide decreases in latency, bandwidth costs, and other inefficiencies experienced conventional server devices.

The method 400 begins at block 402 where a splitter device is configured to split data payloads in a network data stream. In an embodiment, at block 402, the splitter device 322 is configured to split data payloads in a network data stream received over the network 204. The data payloads may be provided via any network data stream and may include various portions (e.g., chunks, sub-payloads) of data that are combined to provide the data payloads. For example, the data payloads may be provided as part of a video data stream and may include encoding information, audio portions, video portions, language information, subtitles, digital rights management (DRM) information, and/or other portions that would be apparent to one of skill in the art in possession of the present disclosure. In another example, the data payloads may include header/metadata portions and body portions.

Figure 5:
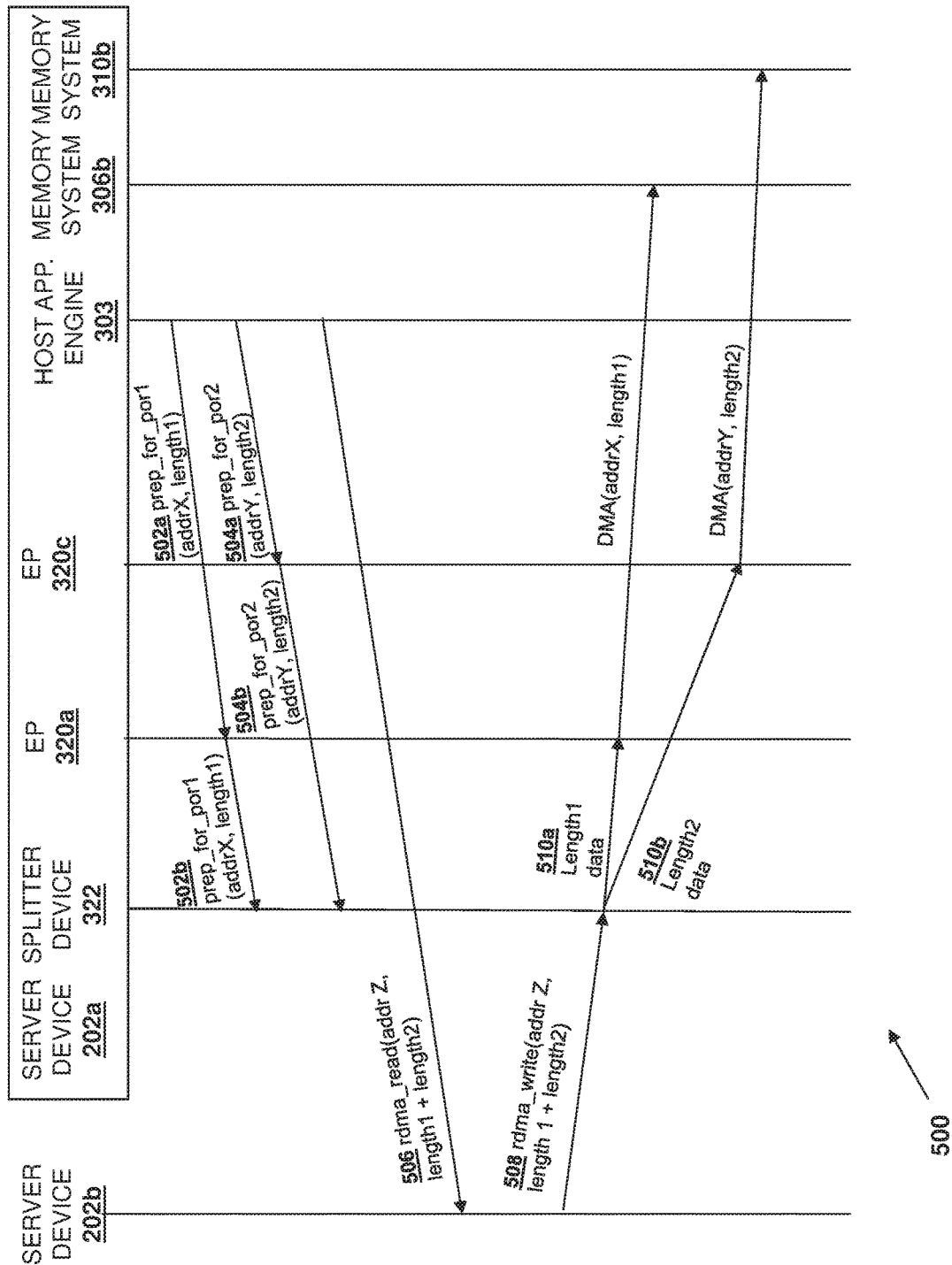
FIG. 5 is a sequence diagram illustrating an embodiment of splitting a network data stream in the multi-processor/endpoint data splitting system provided by the server device of FIG. 2 and during the method of FIG. 4.

In some embodiments, the host application engine 303 may configure the splitter device 322 to split data payloads before the data payloads are received by the splitter device 322. For example, the host application engine 303 may be an application endpoint that is communicating with another application endpoint over the network 204. As illustrated in FIG. 5, the host application engine 303 may be provided in the server device 202a and may communicate with an application provided on the server device 202b. For example, the host application engine 303 provided by the server device 202a may be communicating with the application on the server device 202b using a Remote Direct Memory Access (RDMA) protocol that includes using RDMA protocol verbs to perform pull mode data transfers to obtain data payloads from the application provided by the server device 202b. As such, the lengths of the various portions of the data payloads may be negotiated using the RDMA protocol prior to the actual transfer of the data payloads. Furthermore, the host application engine 303 may be configured to be aware of the splitter device 322 and the endpoint subsystems 320a-320d included on the multi-endpoint adapter splitter device 318.

As illustrated in the sequence diagram 500 provided in FIG. 5, the host application engine 303 may identify two portions of the data payloads that should be processed by separate processing subsystems. For example, the host application engine 303 may identify the portions of the data payloads using the lengths of the data payloads calculated during the RDMA negotiation. As such, a first portion of the data payloads may be identified by the host application engine 303 for processing by the processing subsystem 306a, and at step 502a, the host application engine 303 may provide a first configuration notification to the endpoint subsystem 320a via the communication coupling 315a. The first configuration notification may include a memory address (e.g., addrX) that is included in the memory subsystem 306b that provides local memory for the processing subsystem 306a, and a length (e.g., length1) of the first portion of the data payloads. However, other identifiers may be utilized to identify the first portion of the data payloads while remaining within the scope of the present disclosure as well. At step 502b, the endpoint subsystem 320a may provide the first configuration notification to the splitter device 322, and the splitter device 322 may configure its hardware and/or the splitter engine to recognize the first portion (e.g., length1) of the data payloads when the data payloads are received by the splitter device 322.

Similarly, the host application engine 303 may identify a second portion of the data payload to be processed by the processing subsystem 310a and, at step 504a, the host application engine 303 may provide a second configuration notification to the endpoint subsystem 320c via the communication coupling 315c. The second configuration notification may include a memory address (e.g., addrY) that is included in the memory subsystem 310b that provides local memory for the processing subsystem 310a, and a length (e.g., length2) of the second portion of the data payloads. However, other identifiers may be utilized that identify the second portion of the data payloads while remaining within the scope of the present disclosure as well. At step 504b, the endpoint subsystem 320c may provide the second configuration notification to the splitter device 322, and the splitter device 322 may configure its hardware and/or the splitter engine to recognize the second portion (e.g., length2) of the data payloads when the data payloads are received by the splitter device 322. In some examples, the first portion and the second portion of the data payloads may be asymmetrical in that each has a different length or size. However, in other examples, the first portion and the second portion may be symmetrical in length/size. Furthermore, in other examples the configuration notification may include other information that may be used by the endpoint subsystems 320a-320d and the splitter device 322 to split the data payload. While two portions of the data payload are illustrated in FIG. 5 and FIGS. 6A-6C, one of skill in the art will recognize that the data payload may include any number of portions that may be identified by the host application engine 303 for processing by any of the plurality of processing subsystems 306a, 308a, 310a, and/or 312a while remaining within the scope of the present disclosure as well.

While a specific example of the splitter device 322 being configured to split data payloads received in a network data stream is described at block 402 of method 400, one of skill in the art in possession of the present disclosure will recognize that the splitter device 322 may be configured in other ways to identify and split portions of data payloads. For example, the splitter device 322 may be configured to split TCP/IP protocol data streams, storage protocol data streams, message passing protocol data streams, and/or any other protocol that streams data that would be apparent to one of skill in the art in possession of the present disclosure The method 400 then proceeds to block 404 where a data payload in the network data stream is received. In an embodiment, at block 404, the splitter device 322 may receive the data payload via the port 324. Prior to the splitter device 322 receiving the data payload via the port 324, the host application engine 303 may request the data payload from the server device 202b via the network 204, and the request may cause the server device 202 to provide the data payload to the server device 300 via the network 204. In the specific example illustrated in the sequence diagram 500 of FIG. 5, at step 506 and step 508, the host application engine 303 may perform an RDMA transfer operation that pulls the data payload from the server device 202b. For example, the host application engine 303 may issue a read request for the data payload (e.g., length1+length2) that includes a destination memory address (e.g., addrZ) in its local memory, and the server device 202b may respond by writing the desired data directly into the requested location in the local memory provided for the host application engine using the splitter device 318. As such, the server device 202b may provides the data payload to the multi-endpoint adapter splitter device 318 to perform a DMA write to system memory (e.g., the memory subsystem 306b, the memory subsystem 308b, the memory subsystem 310b, and/or the memory subsystem 312b). As illustrated in FIG. 6A, prior to the DMA write, a data payload 602 that includes a data payload portion 602a and a data payload portion 602b may be received by the splitter device 322 via the port 324.

The method 400 then proceeds to block 406 where portions of the data payload are identified for splitting. In an embodiment, at block 406, the splitter device 322 may identify portions of the data payload to split. In some embodiments, the splitter device 322 and/or the splitter engine may be configured with packet inspection logic to identify the portions included in the data payload. For example, the splitter device 322 may use the configuration performed at block 402 of method 400 to inspect and identify the portions of the data payload for splitting. In the specific example illustrated in FIG. 5, the splitter device 322 may identify a first portion (length1) of the data payload using the first configuration notification received at step 502b, and may identify a second portion (length2) of the data payload using the second configuration notification received at step 504b.

The method 400 then proceeds to block 408 where the data payload is split into the identified portions. In an embodiment, at block 408, the splitter device 322 may split the data payload into the first portion and the second portion. For example, the splitter device 322 and/or the splitter engine may include fragmentation logic that fragments/splits the data payload into the identified portions. As illustrated in FIG. 6B, the splitter device 322 may split the data payload 602 into the data payload portion 602a and the data payload portion 602b.

The method 400 then proceeds to block 410 where each portion of the data payload is provided to a respective endpoint subsystem. In an embodiment, at block 410, the splitter device 322 may forward each portion of the data payload that was split from the received data payload to respective endpoint subsystems. In some embodiments, the splitter device 322 and/or the splitter engine may be configured with forwarding logic to forward each portion of the data payload to its respective endpoint subsystem. For example, the forwarding logic may forward each portion of the data payload to its respective endpoint subsystem using the configuration notifications received during block 402 of method 400 (e.g., the first configuration notification received at step 502*b* and the second configuration notification received at step 504*b*). In a specific example, the configuration notification may have caused the splitter device 322 to map the memory addresses provided in the configuration notifications to the endpoint subsystems that are associated with those memory addresses and that provided the configuration notifications to the splitter device 322.

For example, the first configuration notification received at step 502*b* indicated that the portion length1 was to be written to addrX and was provided by the endpoint subsystem 320*a* and, as such, the portion of the data payload of length1 is forwarded to endpoint subsystem 320*a*. Thus, as illustrated in step 510*a*, the length1 portion of the data payload is provided to the endpoint subsystem 320*a*. As illustrated in FIG. 6C, the data payload portion 602*a* (which may be the length1 portion in FIG. 5) may be forwarded to the endpoint subsystem 320*a*. Similarly, the second configuration notification received at step 504*b* indicated that the portion length2 was to be written to addrY and was provided by the endpoint subsystem 320*c* and, as such, the portion of the data payload of length2 is t forwarded to endpoint subsystem 320*c*. Thus, as illustrated at step 510*b*, the length2 portion of the data payload is provided to the endpoint subsystem 320*c*. As illustrated in FIG. 6C, the data payload portion 602*b* (which may be the length2 portion in FIG. 5) may be forwarded to the endpoint subsystem 320*c*.

The method 400 may then proceed to block 412 where each portion of the data payload is provided to a respective processing subsystem that is included in the plurality of processing subsystems. In an embodiment, at block 412, the endpoint subsystems that received the portions of the data payload may provide those portions to their corresponding processing subsystem. As illustrated in FIG. 6D, the endpoint subsystem 320*a* may provide the data payload portion 602*a* to the processing subsystem 306*a* via the communication coupling 315*a*. Similarly, the endpoint subsystem 320*c* may provide the data payload portion 602*b* of the data payload 602 to the processing subsystem 310*a* via the communication coupling 315*c*. Continuing with the example above in which the host application engine 303 utilizes the RDMA protocol, the endpoint subsystem 320*a* may include a DMA engine to perform a DMA write operation directly into the memory address addrX provided in the memory subsystem 306*b*, which is the local memory for the processing subsystem 306*a*. Similarly, the endpoint subsystem 320*c* may include a DMA engine to perform a DMA write operation directly into the memory address addrX provided in the memory subsystem 310*b*, which is the local memory for the processing subsystem 310*a*. Each processing subsystem 306*a*. 308*a*, 310*a* and/or 312*b* may then process the portion of the data payload that it is designated to process. Continuing with the illustrated example, the processing subsystem 306*a* may process the data payload portion 602*a* provided in the data payload 602, while the processing subsystem 310*a* may process the data payload portion 602*b* provided in the data payload 602. One of skill in the art in possession of the present disclosure will recognize that the method 400 may then be repeated for any data payload received as part of the network data stream, thus providing for data splitting in a multi-processor/endpoint system to provide different portions of data payloads received in a data stream to different endpoint/processor/memory subsystems.

Thus, systems and methods have been described that provide for the splitting of data payloads included in a network data stream between processor/endpoint systems. A splitter device included on a multi-endpoint adapter device may be preconfigured by a host application to split/fragment data payloads into separate portions, and provide each portion to a respective endpoint subsystem associated with a respective processing subsystem that is designated to process that portion of the data payloads. The processing subsystem then receives only the portion of the data payloads that it is designated to process from its endpoint subsystem. As such, processing subsystem interconnects between multiple processing subsystems are not used to copy the data from the local memory of one processing subsystem to the local memory of another processing subsystem, and only a single instance of any data payload is required rather than copies of that data payload for each processing subsystem that is to process a portion of that network data stream By eliminating the need to copy the each complete data payload to each of the processing subsystems through processing subsystem interconnects, or the need to obtain each complete data payload by each processing subsystem over the network, the decreases in latency, decreases in bandwidth costs, and decreases in other inefficient functionality are realized.

Furthermore, the present disclosure is being filed along with U.S. patent application Ser. No. 16/396,022, filed on Apr. 26, 2019, and directed to virtual machine deployment techniques; U.S. patent application Ser. No. 16/396,320, filed on Apr. 26, 2019, and directed to data duplicating techniques; U.S. patent application Ser. No. 16/396,453, filed on Apr. 26, 2019, and directed to packet routing techniques; U.S. patent application Ser. No. 16/395,468, filed on Apr. 26, 2019, and directed to communication coupling configuration techniques; U.S. patent application Ser. No. 16/396,521, filed on Apr. 26, 2019, and directed to connection configuration techniques; and U.S. patent application Ser. No. 16/395,584, filed on Apr. 26, 2019, and directed to sideband communication techniques; each of which include embodiments that utilize the multi-processor/multi-endpoint systems described in some of the embodiments included in the present disclosure. One of skill in the art in possession of the present disclosure will recognize how embodiments of the present disclosure may be combined with some or all of the disclosures discussed above, and thus those disclosures are incorporated by reference herein in their entirety.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multi-endpoint adapter device, comprising:
a processing system that includes a plurality of processing subsystems that each have a respective memory subsystem, wherein the respective memory subsystem for any one of the plurality of processing subsystems is accessible to one or more other processing subsystems via at least one processing subsystem interconnect that couples those processing subsystems together;
a plurality of endpoint subsystems that are each configured to couple to at least one of the plurality of processing subsystems via a plurality of communication couplings;
a network port; and a splitter device that is coupled to the network port and the plurality of endpoint subsystems, wherein the splitter device is configured to:
  receive, via the network port and in response to a request from a host application operated by the plurality of processing subsystems for a first data payload stored on a server device, the first data payload;
  identify a first data sub-payload that is included in the first data payload and that is associated with a first endpoint subsystem that is included in the plurality of endpoint subsystems and that is associated with a first processing subsystem included in the plurality of processing subsystems;
  identify a second data sub-payload that is included in the first data payload and that is associated with a second endpoint subsystem that is included in the plurality of endpoint subsystems and that is associated with a second processing subsystem included in the plurality of processing subsystems, wherein the first data sub-payload is to be provided to the first processing subsystem and the second data sub-payload is to be provided to the second processing subsystem without utilizing the at least one processing subsystem interconnect that couples the first processing subsystem to the second processing subsystem;
  split the first data payload into the first data sub-payload and the second data sub-payload;
  forward the first data sub-payload to the first endpoint subsystem; and
  forward the second data sub-payload to the second endpoint subsystem.

2. The multi-endpoint adapter device of claim 1, wherein the first endpoint subsystem is configured to:
  provide, via a first communication coupling that is included in the plurality of communication couplings and without utilizing the at least one processing subsystem interconnect coupled to the first processing subsystem, the first data sub-payload to the first processing subsystem that is included in the plurality of processing subsystems.

3. The multi-endpoint adapter device of claim 2, wherein the providing the first data sub-payload to the first processing subsystem includes performing a direct memory access operation that stores the first data sub-payload in a first memory subsystem that is coupled to the first processing subsystem.

4. The multi-endpoint adapter device of claim 1, wherein the second endpoint subsystem is configured to:
  provide, via a second communication coupling that is included in the plurality of communication couplings and without utilizing the at least one processing subsystem interconnect coupled to the second processing subsystem, the second data sub-payload to the second processing subsystem that is included in the plurality of processing subsystems.

5. The multi-endpoint adapter device of claim 4, wherein the providing the second data sub-payload to the second processing subsystem includes performing a direct memory access operation that stores the second data sub-payload in a second memory subsystem that is coupled to the second processing subsystem.

6. The multi-endpoint adapter device of claim 1, wherein the splitter device is configured to:

receive, via the first endpoint subsystem, a first configuration notification that identifies the first data sub-payload;
  receive, via the second endpoint subsystem, a second configuration notification that identifies the second data sub-payload; and
  use the first configuration notification to identify the first data sub-payload; and
  use the second configuration notification to identify the second data sub-payload.

7. An information handling system (IHS), comprising:
a processing system;
a memory system that is coupled to the processing system and that includes instructions that, when executed by the processing system, cause the processing system to provide a multi-endpoint adapter splitter engine configured to:
  receive, via a network port and in response to a request from a host application running on a plurality of processing subsystems included in a primary processing system for a data payload that is stored on a server device, the data payload, a first data payload, wherein the plurality of processing subsystems each have a respective memory subsystem, and
  wherein the respective memory subsystem for any one of the plurality of processing subsystems is accessible to one or more other processing subsystems via at least one processing subsystem interconnect that couples those processing subsystems together;
  identify a first data sub-payload that is included in the first data payload and that is associated with a first endpoint subsystem that is included in a plurality of endpoint subsystems that are provided by a multi-endpoint adapter device and that is associated with a first processing subsystem included in the plurality of processing subsystems in the primary processing system;
  identify a second data sub-payload that is included in the first data payload and that is associated with a second endpoint subsystem that is included in the plurality of endpoint subsystems that are provided by the multi-endpoint adapter device and that is associated with a second processing subsystem included in the plurality of processing subsystems in the primary processing system, wherein the first data sub-payload is to be provided to the first processing subsystem and the second data sub-payload is to be provided to the second processing subsystem without utilizing the at least one processing subsystem interconnect that couples the first processing subsystem to the second processing subsystem;
  split the first data payload into the first data sub-payload and the second data sub-payload;
  forward the first data sub-payload to the first endpoint subsystem; and
  forward the second data sub-payload to the second endpoint subsystem.

8. The IHS of claim 7, further comprising:
the first endpoint subsystem that is configured to:
  provide, via a first communication coupling that is included in a plurality of communication couplings provided by the multi-endpoint adapter device and without utilizing the at least one processing subsystem interconnect coupled to the first processing subsystem, the first data sub-payload to the first processing subsystem that is included in a plurality of processing subsystems that are coupled to the multi-endpoint adapter device.

9. The IHS of claim 8, wherein the providing the first data sub-payload to the first processing subsystem includes performing a direct memory access operation that stores the first data sub-payload in a first memory subsystem that is included in a plurality of memory subsystems and that is coupled to the first processing subsystem.

10. The IHS of claim 7, further comprising:
the second endpoint subsystem that is configured to:
provide, via a second communication coupling that is included in a plurality of communication couplings provided by the multi-endpoint adapter device and without utilizing the at one least processing subsystem interconnect coupled to the second processing subsystem, the second data sub-payload to the second processing subsystem that is included in a plurality of processing subsystems that are coupled to the multi-endpoint adapter device.

11. The IHS of claim 10, wherein the providing the second data sub-payload to the second processing subsystem includes performing a direct memory access operation that stores the second data sub-payload in a second memory subsystem that is included in a plurality of memory subsystems and that is coupled to the second processing subsystem.

12. The IHS of claim 7, wherein the multi-endpoint adapter splitter engine is configured to:
receive, via the first endpoint subsystem, a first configuration notification that identifies the first data sub-payload;
receive, via the second endpoint subsystem, a second configuration notification that identifies the second data sub-payload; and
use the first configuration notification to identify the first data sub-payload; and
use the second configuration notification to identify the second data sub-payload.

13. A method of splitting a network data stream, comprising:
providing, by a splitter device via a network port coupled to the splitter device, a request received from a host application hosted on a plurality of processing systems for a data payload that is stored on a server device,
wherein the plurality of processing subsystems each have a respective memory subsystem, and
wherein the respective memory subsystem for any one of the plurality of processing subsystems is accessible to one or more other processing subsystems via at least one processing subsystem interconnect that couples those processing subsystems together;
receiving, by the splitter device and via the network port and in response to the request, a first data payload;
identifying, by the splitter device, a first data sub-payload that is included in the first data payload and that is associated with a first endpoint subsystem that is included in a plurality of endpoint subsystems coupled to the splitter device and that is associated with a first processing subsystem included in the plurality of processing subsystems;
identifying, by the splitter device, a second data sub-payload that is included in the first data payload and that is associated with a second endpoint subsystem that is included in the plurality of endpoint subsystems and that is associated with a second processing subsystem included in the plurality of processing subsystems, wherein the first data sub-payload is to be provided to the first processing subsystem and the second data sub-payload is to be provided to the second processing subsystem without utilizing the at least one processing subsystem interconnect that couples the first processing subsystem to the second processing subsystem;
splitting, by the splitter device, the first data payload into the first data sub-payload and the second data sub-payload;
forwarding, by the splitter device, the first data sub-payload to the first endpoint subsystem; and
forwarding, by the splitter device, the second data sub-payload to the second endpoint subsystem.

14. The method of claim 13, further comprising:
providing, by the first endpoint subsystem and via a first communication coupling that is included in a plurality of communication couplings between the plurality of endpoint subsystems and the plurality of processing subsystems and without utilizing the at least one processing subsystem interconnect coupled to the first processing subsystem, the first data sub-payload to the first processing subsystem that is included in the plurality of processing subsystems.

15. The method of claim 14, wherein the providing the first data sub-payload to the first processing subsystem includes performing a direct memory access operation that stores the first data sub-payload in a first memory subsystem that is coupled to the first processing subsystem.

16. The method of claim 13, further comprising:
providing, by the second endpoint subsystem and via a second communication coupling that is included in a plurality of communication couplings between the plurality of endpoint subsystems and the plurality of processing subsystems and without utilizing the at least one processing subsystem interconnect coupled to the second processing subsystem, the second data sub-payload to the second processing subsystem that is included in the plurality of processing subsystems.

17. The method of claim 16, wherein the providing the second data sub-payload to the second processing subsystem includes performing a direct memory access operation that stores the second data sub-payload in a second memory subsystem that is coupled to the second processing subsystem.

18. The method of claim 13, further comprising:
receiving, by the splitter device and via the first endpoint subsystem, a first configuration notification that identifies the first data sub-payload;
receiving, by the splitter device and via the second endpoint subsystem, a second configuration notification that identifies the second data sub-payload; and
using, by the splitter device, the first configuration notification to identify the first data sub-payload; and
using, by the splitter device, the second configuration notification to identify the second data sub-payload.

* * * * *